United States Patent
Ingalls et al.

(10) Patent No.: US 6,856,444 B2
(45) Date of Patent: Feb. 15, 2005

(54) INFERENTIAL TEMPERATURE MEASUREMENT OF AN ELECTROCHROMIC DEVICE

(75) Inventors: James F. Ingalls, Forest Lake, MN (US); Freek Stoffelen, Den Haag (NL)

(73) Assignee: Sage Electrochromics, Inc., Fatibault, MN (US)

(*) Notice: Subject to any disclaimer, the term of this patent is extended or adjusted under 35 U.S.C. 154(b) by 64 days.

(21) Appl. No.: 10/142,711

(22) Filed: May 10, 2002

(65) Prior Publication Data

US 2003/0210449 A1 Nov. 13, 2003

(51) Int. Cl.[7] .............................. G02F 1/15; G09G 3/38
(52) U.S. Cl. ...................................... 359/265; 345/105
(58) Field of Search ............................... 359/265, 276, 359/275, 288; 345/76, 77, 81, 85, 87–90, 105; 252/583; 219/400

(56) References Cited

U.S. PATENT DOCUMENTS

| 5,973,819 A | 10/1999 | Pletcher et al. ............. 359/265 |
| 6,045,724 A | 4/2000 | Varaprasad et al. ......... 252/583 |
| 6,080,964 A * | 6/2000 | Gmeiner ..................... 219/400 |
| 6,222,177 B1 | 4/2001 | Bechtel et al. .......... 250/214 B |
| 6,362,806 B1 | 3/2002 | Reichmann et al. ........ 345/105 |
| 6,614,577 B1 | 9/2003 | Yu et al. ..................... 359/265 |

FOREIGN PATENT DOCUMENTS

| EP | 1001307 | 5/2000 |
| JP | 11109423 | 4/1999 |
| WO | WO 97/28484 | 7/1997 |
| WO | WO 02/17008 | 2/2003 |

* cited by examiner

Primary Examiner—Georgia Epps
Assistant Examiner—Jack Dinh
(74) Attorney, Agent, or Firm—Lerner, David, Littenberg, Krumholz & Mentlik, LLP

(57) ABSTRACT

An electrochromic device driver system having inferential temperature measurement of the electrochromic device. The inferred temperature measurements enable the system to determine the maximum but safe driving voltages to improve the speed of varying the transmissivity levels of the electrochromic device without damaging the device.

12 Claims, 12 Drawing Sheets

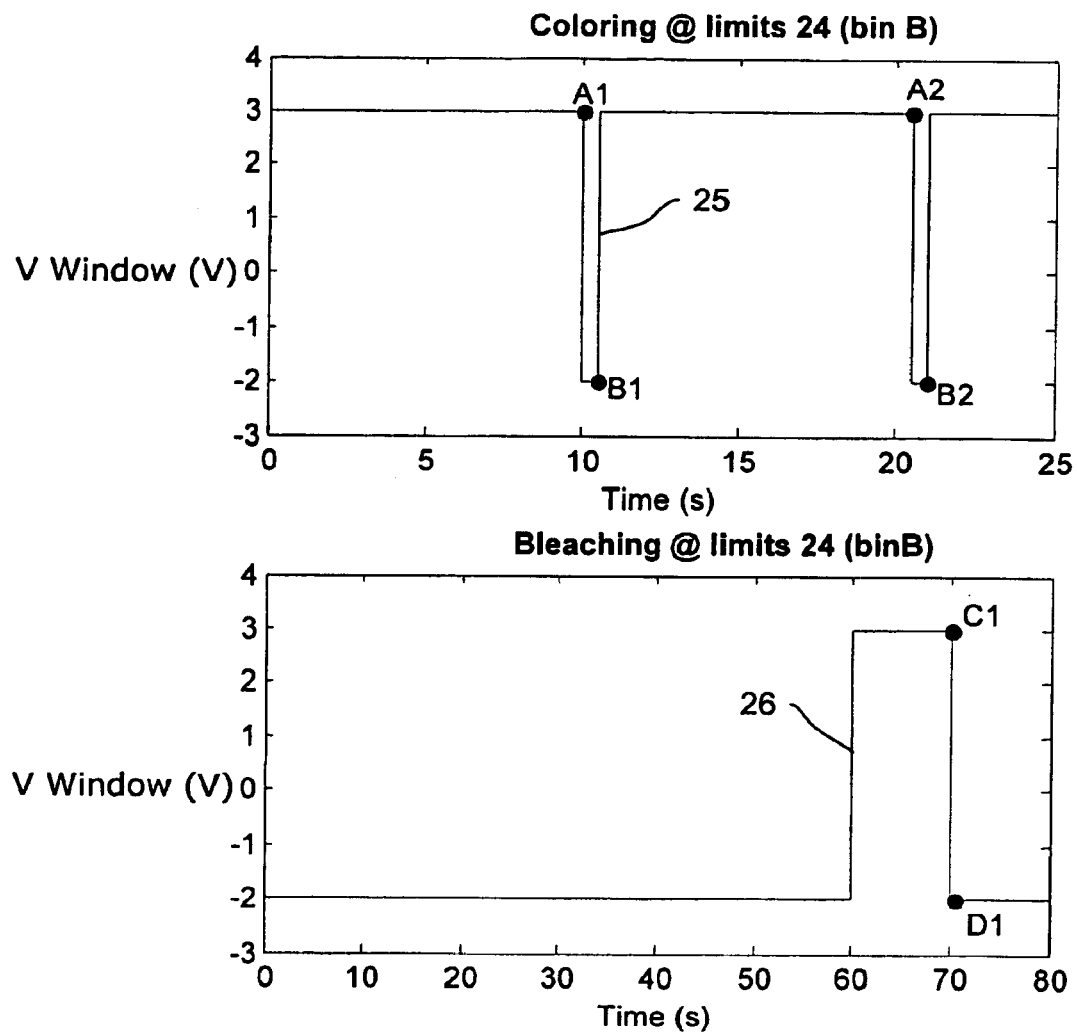

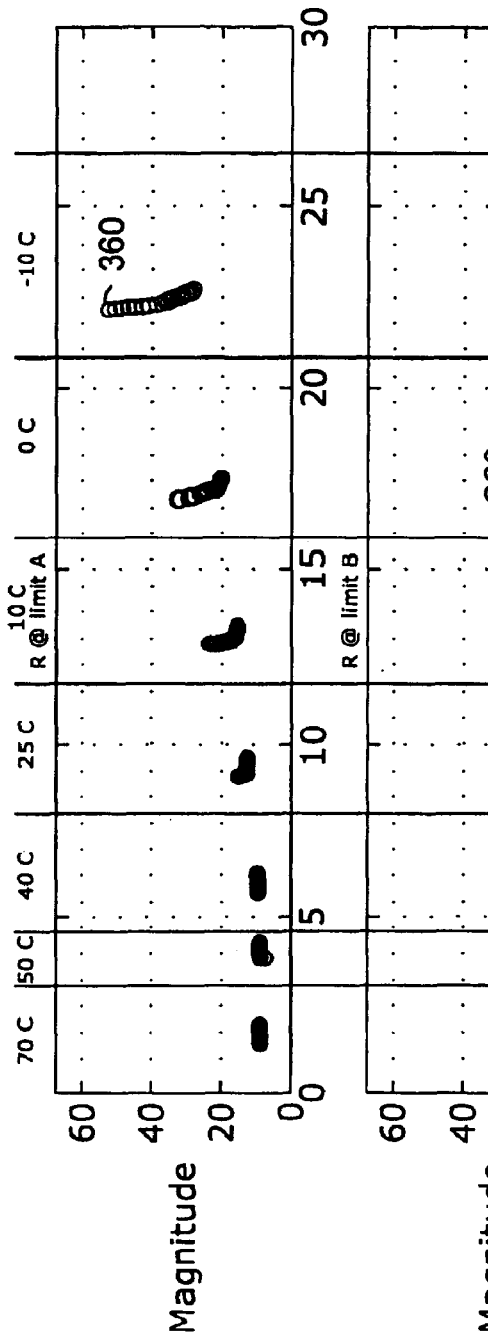
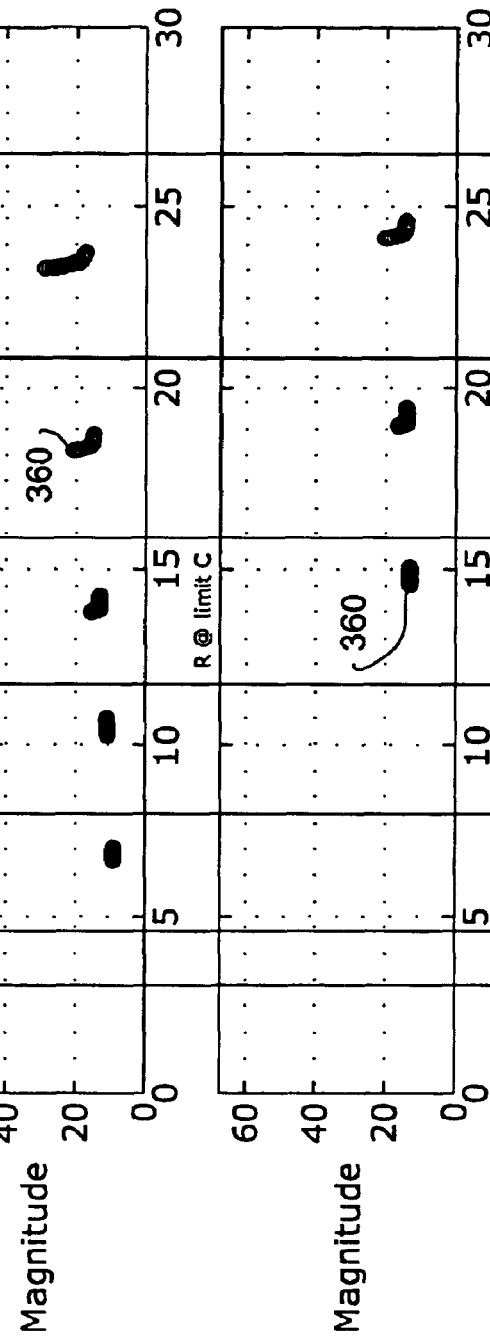
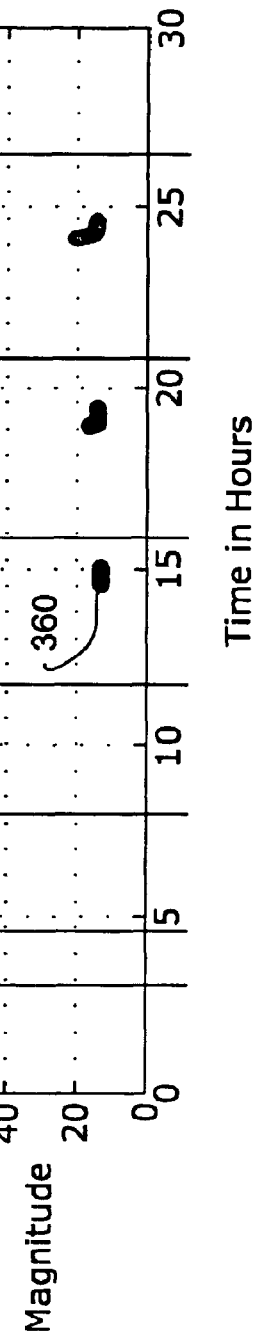
Fig. 9a
Fig. 9b
Fig. 9c

|  | limit | R low | R high |
|---|---|---|---|
| bleach | 28 (A) | -- | 2.6 |
|  | 24 (B) | 2.5 | 4.8 |
|  | 27 (C) | 4.5 | -- |
| color | 28 (A) | -- | 2.3 |
|  | 24 (B) | 2.5 | 4.1 |
|  | 27 (C) | 4.2 | -- |
*Fig. 10*
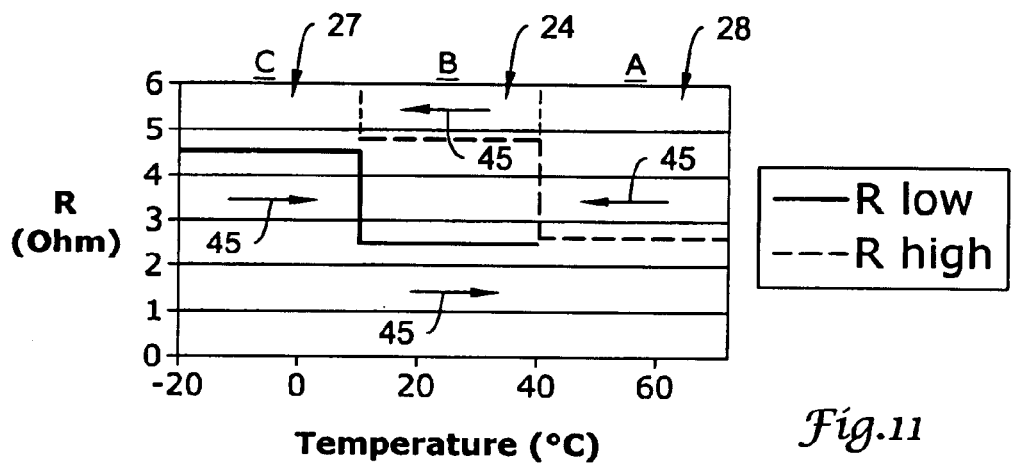
*Fig. 11*
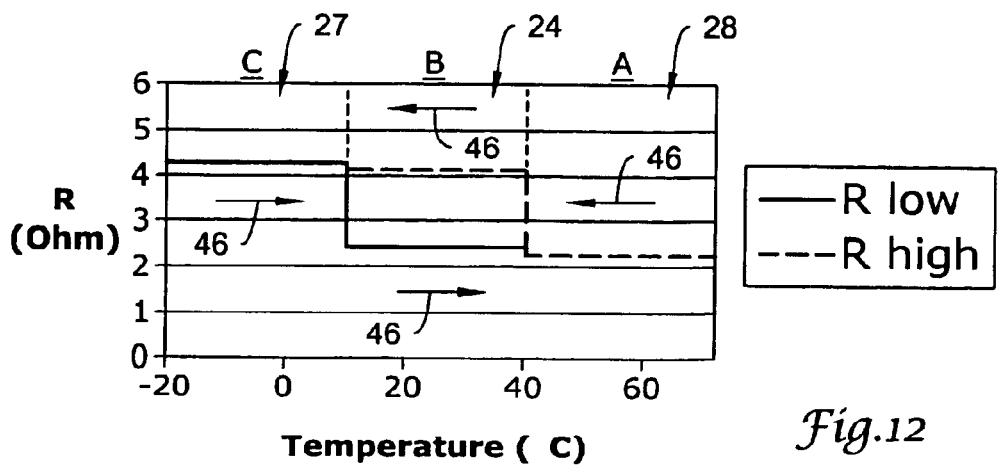
*Fig. 12*

INFERENTIAL TEMPERATURE MEASUREMENT OF AN ELECTROCHROMIC DEVICE

BACKGROUND

The invention pertains to the driving of an electrochromic device from one transmissivity to another in the shortest amount of time but protecting from damage due to overvoltage. Particularly, it pertains to the magnitude and shape of the driving voltages of the device in view of its temperature.

There is a need for driving the electrochromic device to a selected transmissivity as fast as possible without damage to the device due to excessive driving voltages. The maximum magnitude of the driving voltages is dependent upon the temperature of the device. However, determination of the temperature is problematic since use of an external and/or specific temperature sensor is costly, difficult to manufacture and prone to failure.

Electrochromic technologies, specifically inorganic thin film materials, can result in a dimmable window controllable with a low voltage DC source. The glass is essentially a two terminal device which behaves similar to a battery. Applying a voltage to the device can move ions into the electrochromic layer where they will absorb light and dim or "color" the device. The ions can be moved back to the storage layer by reversing the applied voltage and cause the device to lighten or "bleach".

SUMMARY

The present invention solves the above-noted problems of temperature determination of the electrochromic device. A device such as an electrochromic window may need a variable voltage and a polarity reversal to efficiently control the light transmittance level of the device, and should utilize optimum voltages without damaging the device. The invention involves an apparatus or a method that infers the device temperature based on measurements of voltage and current applied to the device. From this information, appropriate driving voltages may be set for high performance operation without damaging the device.

BRIEF DESCRIPTION OF THE DRAWINGS

FIG. 8a is a graph of voltage and current measurement points for the coloring function;

FIG. 8b is a graph of voltage and current measurement points for the bleaching function;

FIG. 9a is a plot of resistance values calculated from measurements made on a device at various known temperatures using limit A;

FIG. 9b is a plot of resistance values calculated from measurements made on a device at various known temperatures using limit B;

FIG. 9c is a plot of resistance values calculated from measurements made on a device at various known temperatures using limit C;

FIG. 10 is a chart showing the cross-over values for bleaching and coloring transitions;

FIG. 11 is a graph of cross-over values for the bleaching transition;

FIG. 12 is a graph of cross-over values for the coloring transition;

DESCRIPTION

Control of an electrochromic window is an example application of the present invention. Electrochromic windows consist of several layers of materials. A dimming function (i.e., coloring) of an illustrative device results from the transport of hydrogen or lithium ions from an ion storage layer and through an ion conduction layer, and injecting them into an electrochromic layer.

Figure 1:
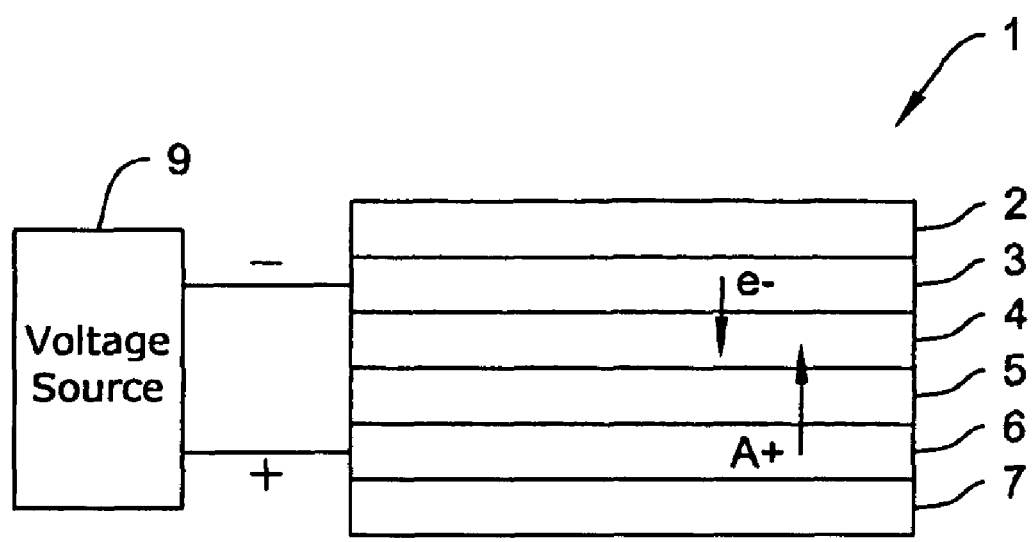
FIG. 1 shows a basic electrochromic device controlled by the invention.

FIG. 1 is an instance of a cross-section of an electrochromic window 1 having variable light transmittance. The layers of window 1 include a glass or plastic substrate 2, a transparent conducting oxide 3, and electrochromic layer 4, an ion conductor/electrolyte 5, an ion storage layer 6 and a transparent conducting oxide 7. Electrochromic layer 4 typically is tungsten oxide ($WO_3$). The presence of ions in electrochromic layer 4 changes its optical properties, causing it to absorb visible light. The large scale result is that window 1 darkens.

The central three layers 4, 5 and 6 are sandwiched between layers 3 and 7 of transparent conducting material. All of the layers 3, 4, 5, 6 and 7 are coated, one at a time, onto layer 2 which may be composed of glass, plastic or some other transparent material.

A negative voltage applied to conducting oxide layer 3 and a positive voltage applied to conducting oxide layer 7, from a voltage source 9 or driver 10, causes hydrogen or lithium anions ($A^+$) to be injected from ion storage layer 6 through ion conducting layer 5 into electrochromic layer 4. This application of voltage to layers 3 and 7 causes window 1 to darken (or "color"). To lighten (or "bleach") window 1, the voltage to layers 3 and 7 is reversed thereby driving the ions in the opposite direction out of electrochromic layer 4 through ion conducting layer 5 into ion storage layer 6. As the ions migrate out of electrochromic layer 4, it lightens (or "bleaches") and window 1 becomes transparent again.

An electrochromic (EC) device changes transmission level more slowly at cold temperatures. At low temperatures, the device is too slow if driven at voltage levels which are safe at all temperatures. Yet, it is advantageous to change the transmissivity of the EC device with highest possible voltages, since the higher the applied voltage, the faster the change of transmissivity effected. But the device may be damaged if the applied voltage is too large, so it is important to know the electrochromic device temperature so that the maximum but safe voltages can be used for transitioning the EC device.

Figure 2:
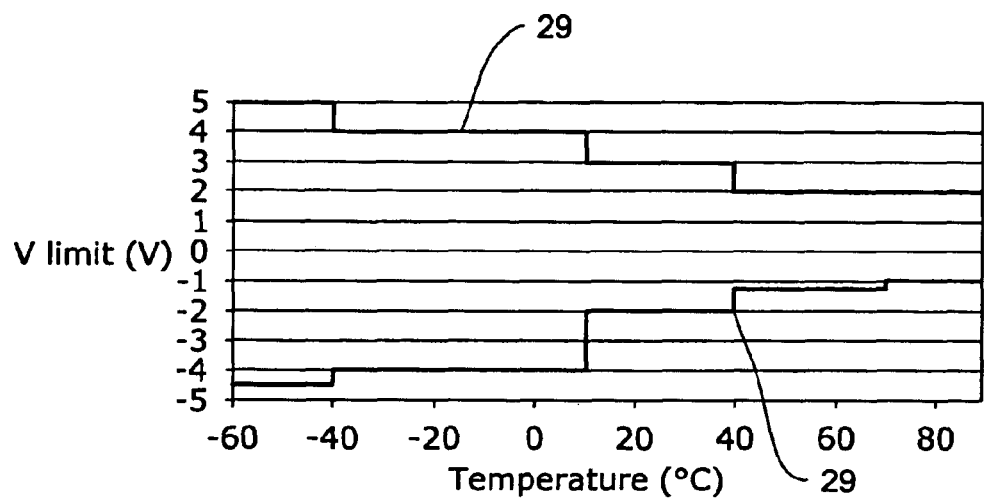
FIG. 2 is a graph of voltage limits for safe electrochromic device operation.

Cycling electrochromic devices at different temperatures and different voltages has resulted in a table of safe operating voltages at temperatures ranging from about −60° C. to +90° C., as shown in FIG. 2. The voltage driving results 29 of FIG. 2 are simplified to those of levels 27, 24 and 28 in FIG. 3, without significantly affecting on the response time of the device utilizing approximate voltage limits versus temperature data of FIG. 3. Lines 24 (i.e., bin B) reveal the voltage limits for a device 16 temperature between +10 and +40 degrees C. Lines 27 (i.e., bin C) reveal the voltage limits for temperatures from −60 to +10 degrees C. Lines 28 (i.e., bin A) reveal the voltage limits for temperatures between +40 and +90 degrees C. For each bin or limit, the voltages may be lower but at the cost of slower performance. Data acquisition may include temperature of the device, spot measurement of the device state as well as measuring the device voltages and currents. The data revealed that the temperature of the device effected the magnitude of current delivered to the device when apply a step voltage as well as the rate change of current when applying a fixed voltage across the device. Since the measurements are affected by temperature then a value calculated from these measurements will also be affected by temperature. Resistance is a value, which can be calculated on the basis of a change of voltage divided by a change of current. The resistance is viewed in two portions. One portion is dependent on temperature and the other portion is device specific. The device specific part is substantially the resistance of the device leads and sheet resistance of the transparent conductors. This static resistance (i.e., static relative to temperature change) is measured with a 10 KHz signal. This 10 KHz signal permits such resistance measurement because the electrochromic layers of device 16 cannot react fast enough to that signal. The equations for calculating the resistances are:

$$R_{color} = \frac{V_{AI} - V_{BI}}{I_{AI} - I_{BI}} - R @ 10 \text{ Khz} \quad (1)$$

$$R_{Bleach} = \frac{V_{CI} - V_{DI}}{I_{CI} - I_{DI}} - R @ 10 \text{ Khz} \quad (2)$$

The other terms of equations (1) and (2) are discussed below.

Figure 4:
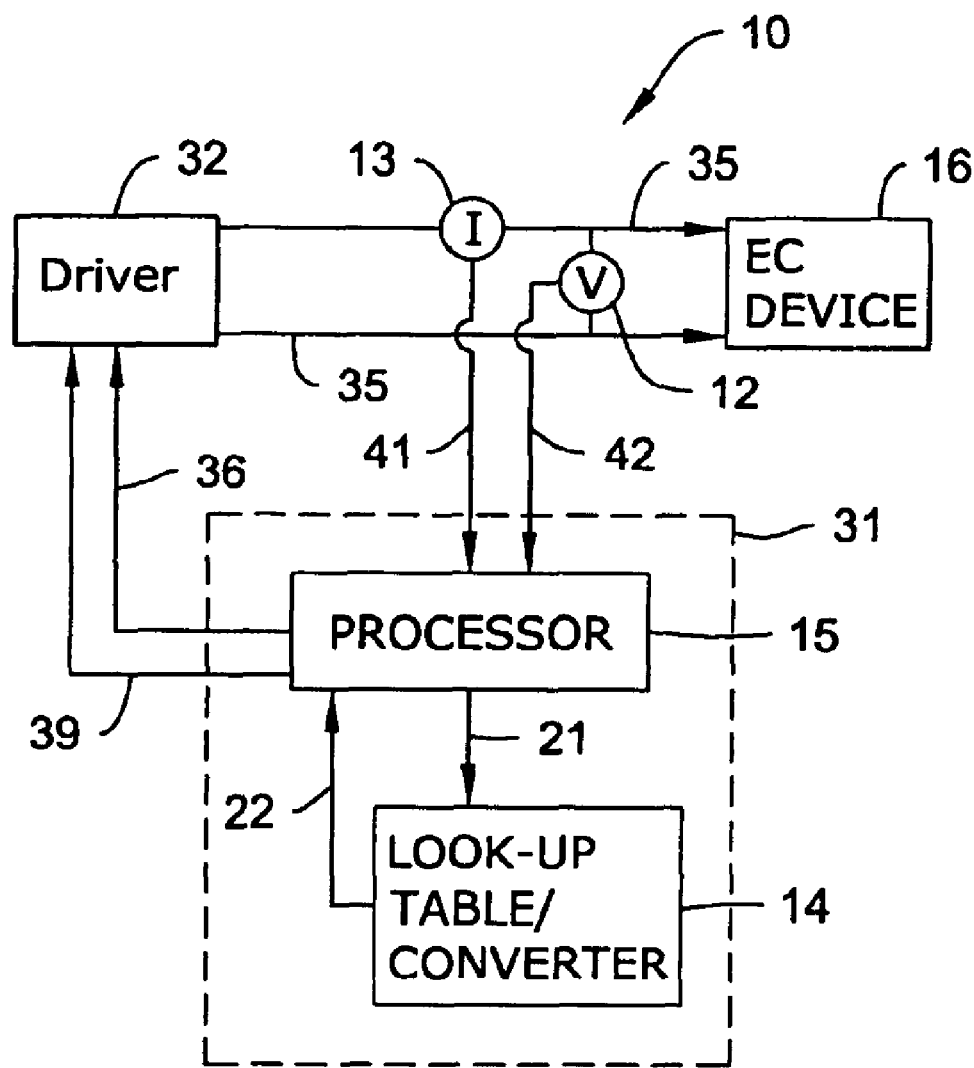
FIG. 4 is a schematic of some hardware that may be used for controlling the transmission level of an electrochromic device.

In FIG. 4, a diagram reveals a possible mechanism 10 for controlling an electrochromic device 16. It includes a driver 32, voltage 12 and current 13 measuring mechanisms or meters, a component 14 with look-up table, converter or the like and a processor 15. Component 14 may be integral to processor 15. Processor 15 and component 14 might make up at least a part of a microcontroller 31. Or component 14 may not be needed or it may be substituted by an equivalent component. The voltages and currents of the driving signals on lines 35 to electrochromic (EC) device 16 are measured by a voltage sensor 12 and current sensor 13, respectively. The measurements are taken at different points of a waveform as described below. Voltage and current measurement signals 42 and 41 go to processor 15 and are converted to resistance information 21 from which device 16 temperatures are inferred, if needed, for maximum voltage determinations for driving device 16. Information 21 goes to component 14 which effectively is a look-up table or other mechanism which can provide safe maximum device 16 operating voltage information 22 based on device 16 resistance information 21. The correlation of resistance information 21 with device voltage information 22 was compiled from testing which determined safe maximum operating voltages at various device 16 temperatures. Processor 15 may convert information 22 into a signal 36 which sets an appropriate driving voltage from driver 32 to device 16. This maximum driving voltage permits driving an electrochromic device 16 as fast as possible without exceeding safe operating limits of device 16 at its present temperature. The voltage required to hold device 16 at a given state is always within the safe operating voltage range regardless of the device temperature. The only time that resistance or temperature information is needed is when device 16 is transitioning from one transmission level or state to another.

The general concept of the process is to infer the temperature of the device by observing the response of the device current due to applied voltages. There may be three distinct modes for applying a voltage to the device. The holding mode is where the device is being held at a specific transmissivity (state). The voltage required to hold the device at any state is safe regardless of the temperature. The transition mode is where the device is being changed to a new state either lighter (bleaching) or darker (coloring). To change the device state the controller may apply the maximum voltage allowed depending on whether device 16 is being bleached or colored and what the device temperature is. The measurement mode is where the voltage to the device will be toggled between a positive and negative voltage to allow measuring change in voltage and change in current which is used to calculate a resistance. This calculated resistance may be used to infer what the device 16 temperature is and what the maximum safe voltage limits are for driving device 16 to a change of transmission level.

Figure 5:
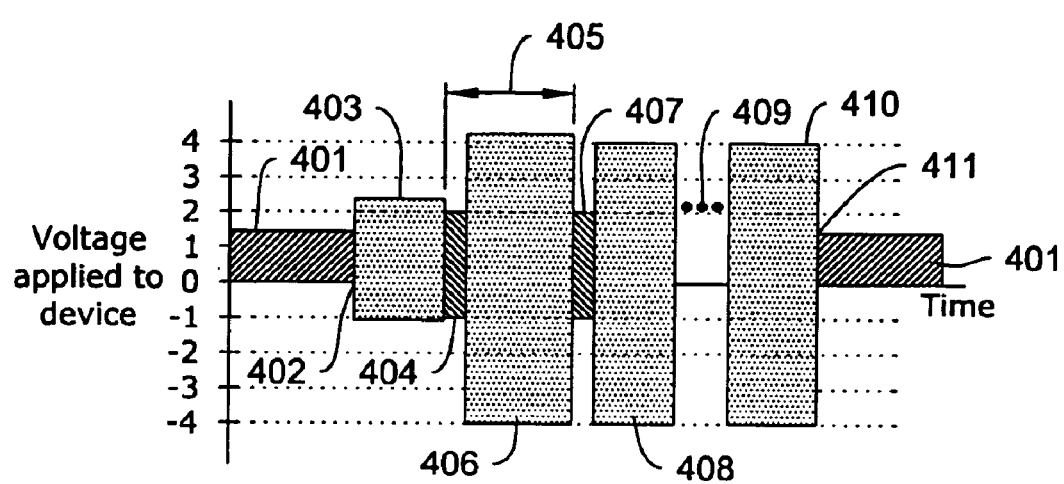
FIG. 5 is a diagram of voltage levels in the measurement mode which always the same and are safe for all temperatures.
Figure 6:
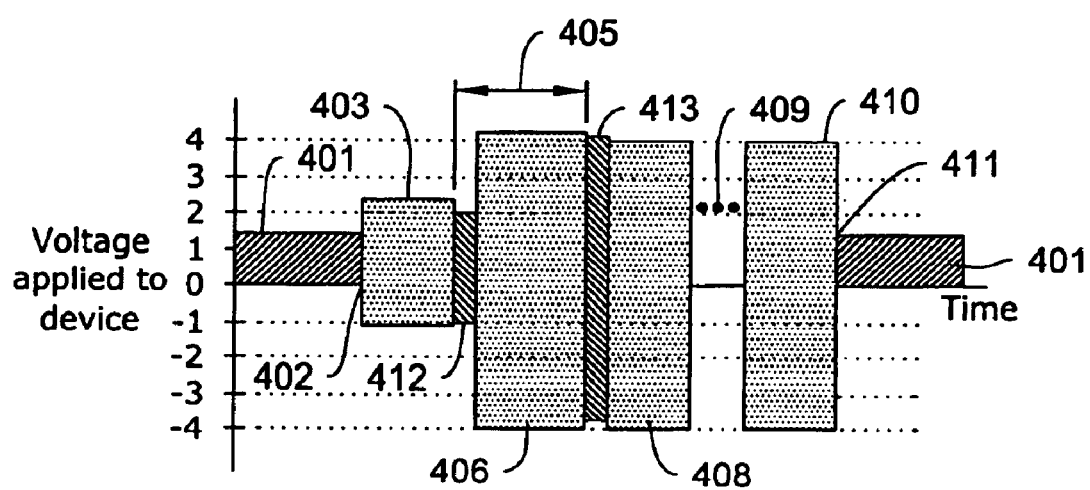
FIG. 6 shows a diagram where the measurement mode uses the maximum voltage levels allowed given the current temperature.

The FIGS. 5 and 6 below show the various voltages that can be applied to the device depending on what mode the controller is in. The voltages are identical except for the measurement mode voltage levels. In FIG. 5, the voltage levels in the measurement mode are the same and are safe for various temperatures. This allows for determining the safe operating voltage range with only four points (2 for coloring and 2 for bleaching). FIG. 6 shows the measurement mode using the maximum voltage levels allowed given the current temperature. This method may give results having less variance when measuring at lower temperatures but having such may increase the number of points from 4 to 8 in order to determine the safe operating voltage limits. Depending on how accurate the temperature sensing needs to be, either method could be used. With the current 3 bin safe voltage limits of FIG. 3 the temperature sensing does not need to be very accurate. If in the future it was found that more voltages could be added and more bins were created then accuracy may become more important.

FIGS. 5 and 6 further show setpoints and voltages of the method for inferring temperature and selecting drive voltages. In FIG. 5, the system involves fixed voltage levels in the measurement modes. This approach is less complex but less accurate than the process in the FIG. 6. Area 401 is the holding mode where device 16 is held at a specific transmissivity (state). This range of voltage applied to device 16 is safe at any temperature of the device. Point 402 is a setpoint change requiring device 16 to change state, i.e., to be colored or bleached. Transition mode 403 starts with the lowest limit, +2 volts and −1 volt, safe for all temperatures of device 16. Measurement mode 404 utilizes voltages safe for all measurement, which are about +2 volts and about −1 volt. In this mode 404, the applied voltage is varied to get delta V and delta I measurement to calculate a resistance and determine temperature. The applied voltage may be varied multiple times to obtain multiple measurements which may be averaged. Periodic measurements 405 are made to monitor temperature during transitions. During transition mode 406, about plus 2, 3 or 4 volts may be applied for coloring, or about −1, −2 or −4 volts may be applied for bleaching, depending on the results of the last delta V and delta I measurements. Measurement mode 407 is the next periodic check of delta V and delta I for monitoring temperatures of device 16 during a transition. Mode 408 is another transition wherein an integer voltage level is applied to change a device 16 state, in accordance with the bleaching or coloring having certain voltage limits dictated by device temperature. This process 409 of modes is iterative as necessary for coloring or bleaching . . . At a last transition mode 410, when the device has achieved a prescribed state, the system goes back to holding mode 401.

In FIG. 6, the voltage levels in the measurement mode are variable in contrast to the fixed voltage levels in FIG. 5. The measurement made with the variable voltage levels is more accurate but more complex than the mode with fixed voltage levels. The process or the method is the same as that in except for the voltage levels applied in the measurement mode. In measurement mode 412, the applied voltage is varied as usual to get delta V and delta I measurements to calculate a resistance and infer the device 16 temperature; however, instead of using the approximately +2 volt and −1 volt levels which are safe for various temperatures, maximum and minimum values based on present device temperature are used. The same approach applies for measurement mode 413 which is to use the maximum (+2, +3 or +4 volts) and minimum (−1, −2 or −4) values based the inferred temperature of device 16.

Figure 7:
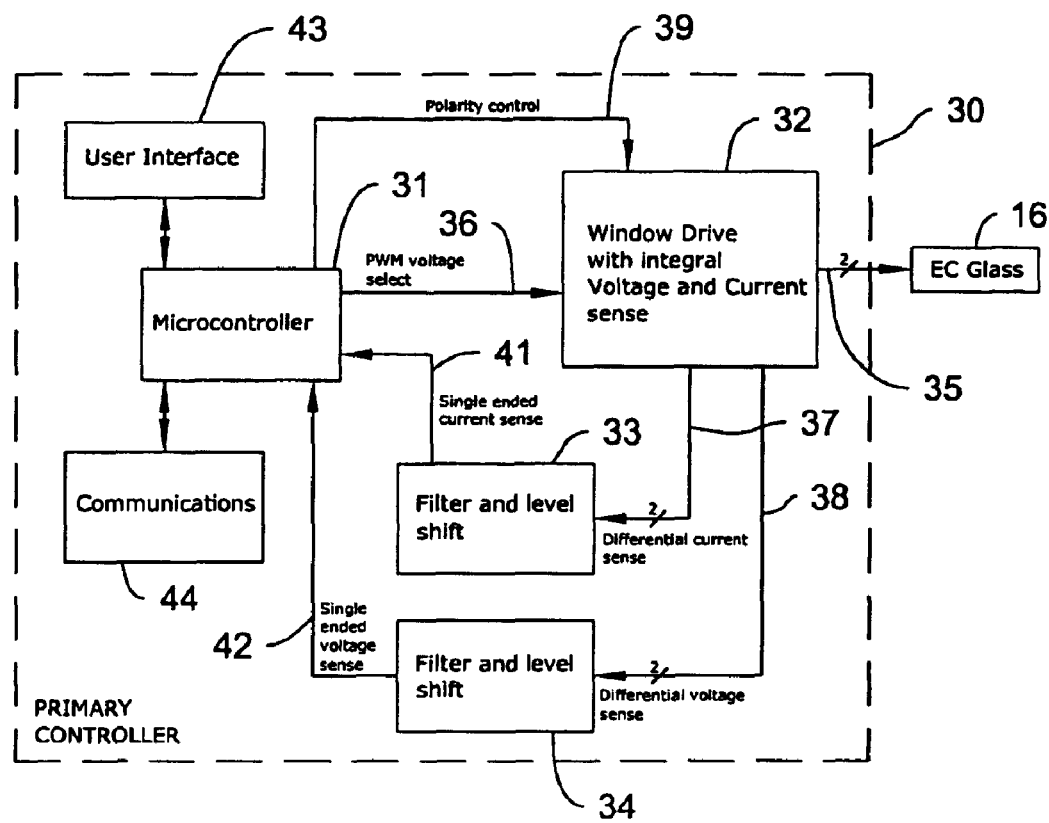
FIG. 7 is a block of components that may be used for controlling an electrochromic device having its driving voltages controlled for optimum performance.

The hardware block diagram of FIG. 7 shows a platform 30 required for the method, process and/or algorithm disclosed here. The temperature will only be calculated while device 16 is transitioning from one state to another. In general, controller 31 will apply the maximum allowed voltage (based on temperature) until the device 16 state is within approximately 5 percent of the desired state. At this point, controller 31 will go to a holding voltage and vary the voltage based on feedback from a transmission sensor or using inferential transmission sensing. The holding voltage will be limited to the lowest limits (associated with the highest temperatures).

The circuitry of the blocks shown in FIG. 7 may be used for powering the EC device 16, selecting the polarity of the driving signals to device 16, having the capability to open-circuit device 16 and allow for measuring the applied current and voltage at device 16. Several goals met with circuitry 30 include efficient delivery of power to device 16 with minimal size and no heat sink, providing a voltage to device 16 with a range from about −4 to about +4 volts DC and at about 0.75 amperes, with a measurement of current and voltage from about −4 to about 4 volts DC, measurement of open-circuit potential of EC device 16, and fail-safe operation which includes protection of device 16 when microcontroller 31 fails. For instance, the voltages do not increase upon microcontroller failure.

Implementation 30 is an illustrative system for a primary controller of EC device 16. Window drive 32 provides control signals 35 to device 16. Drive 32 takes integral voltage and current sense of the signals 35 sent to device 16. Microcontroller 31 provides a pulse width modulated (PWM) voltage select signal 36 to drive 32. Signal 36 sets the magnitude of the voltage signals 35 sent to device 16. Microcontroller 31 also provides a polarity control signal 39 to drive 32 for setting the polarity of signals 35. Drive 32 provides a differential current sense measurement signal 37 to filter and level shift component 33 and a differential voltage sense measurement signal 38 to filter and level shift component 34. Component 33 provides a single ended current sense measurement signal 41 and component 34 provides a single ended voltage sense measurement signal 42 to microcontroller 31. Signals 41 and 42 have information which enables microcontroller 31 to provide the appropriate voltage select signal 36 to drive 32 for a particular polarity signal 39. User interface 43 and communications component 44 are connected to microcontroller 31 so that an operator may observe information from and control various aspects of microcontroller 31 and drive 32.

When electrochromic device 16 is about to transition to a new state, the controller may first apply the maximum voltage which is safe for all temperatures for a fixed period of time. The results appear better where there is coloring or bleaching for a minimum period of time before the start of reversing the polarity of the applied voltage. At regular intervals during the transition, controller 31 will apply an opposite voltage (either fixed or maximum possible based on temperature depending on what measurement mode is being used) for a short periods of time of about one second and about ten seconds for coloring and bleaching, respectively, as shown by waveforms 25 and 26 in FIGS. 8a and 8b. The controller uses the voltages ($V_{A1}$–$V_{B1}$ and $V_{C1}$–$V_{D1}$) and currents ($I_{A1}$–$I_{B1}$ and $I_{C1}$–$I_{D1}$) from before and after the voltage changes to calculate values indicating the resistance of device 16 during coloring and bleaching, respectively, at limits 24 (bin B) of FIG. 3. The above equations (1) and (2) may be used for the resistance calculations. While bleaching, it is noted that one needs to color for a longer period of time before taking the base reading and then one can go back to bleach. This action improves the repeatability of the measurements. The value and the magnitude of the voltage and current changes, used to calculate resistance, are used to infer the device temperature. If the resulting value of resistance rises above a predetermined threshold, then the controller increases the maximum voltages and continues to transition to a new state. If the resulting value of resistance falls below a predetermined threshold, then the controller decreases the maximum voltages and continues to transition to a new state.

FIGS. 9a, 9b and 9c are plots of resistance values 360 calculated from measurements made on a device at various known temperatures. FIG. 9a shows the values when the measurement mode used limit A voltages (+2,−1). FIG. 9b shows the values when the measurement mode used limit B voltages (+3,−2). FIG. 9c shows the values when the measurement mode used limit C voltages (+4,−4). These plots illustrate how the variance of the measurement increases with colder temperatures and decreases with increased voltage limits while in measurement mode. It is seen that even with the lowest limit (A) that there are enough differences in the values between temperatures to allow for selecting the correct safe operating voltage as shown in FIG. 3.

Figure 3:
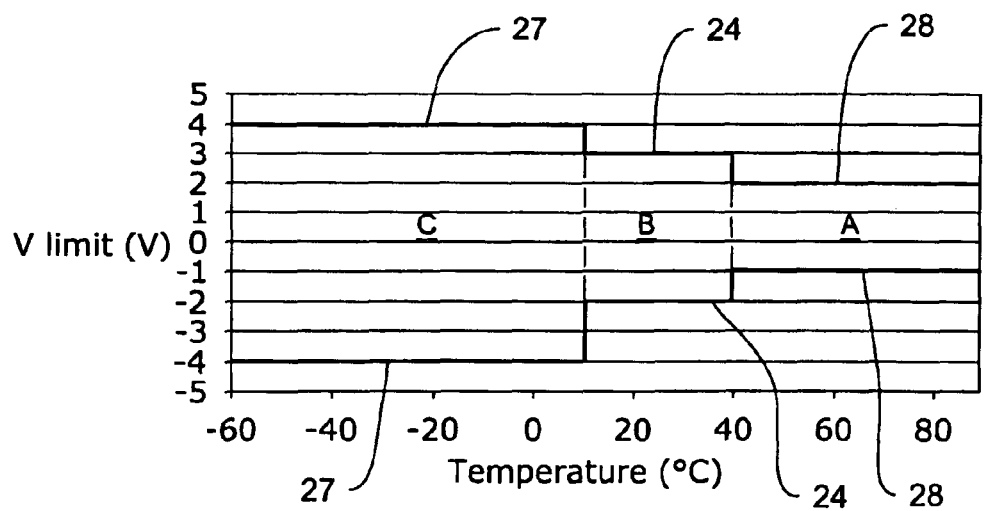
FIG. 3 is a graph of simplified voltage limits for safe electrochromic device operation.

The simplified voltage limits of FIG. 3 split the temperature range into three bins, C, B and A, i.e., limits 27, 24 and 28, which have cross-over temperatures at +10 and +40 degrees C. that define the boundaries of the bins. Since the calculated value of resistance depends on the magnitude of the voltage changes, including those changes measured across a shunt resistor connected in series with a connection to device 16, and on whether device 16 is bleaching or coloring, then these two boundaries will be defined by four resistance values for each transition direction. When the measurement mode uses the fixed voltages safe for all temperatures then the number of cross-over values may be reduced 2 for each direction rather than the four values required when the measurement mode used variable voltages. FIG. 10 is a table showing the cross-over resistance values in ohms for bleaching and coloring when using the measurement mode which applies the maximum and minimum voltages allowed based on the currently inferred temperature. FIGS. 11 and 12 are a graphical representation of FIG. 10 showing the transitions from one limit to another. FIG. 11 shows the cross-over resistance values for the bleaching transition and FIG. 12 shows the cross-over resistance values for the coloring transition for limits 27 (C), 24 (B) and 28 (A). These values are satisfactory for transitions in the direction of arrows 45 and 46 within the respective limits noted in FIGS. 11 and 12. Experiments where cross-over values were determined for several pieces of EC glass indicated that these values can be based on a percentage of a measured value at room temperature. These results show no need to soak the EC device in an oven to determine the cross-over values. Thus, the process of calibrating each device is drastically reduced.

As an illustrative example of the voltage value determination when the measurement mode uses variable voltage levels, consider a device 16 that is currently bleached and transitioning to a colored state and the temperature of device 16 is minus ten degrees C. Controller or processor 31 may start to color device 16 at limit 28 (bin A) and take resistance readings. If the readings are higher than the cross-over values (i.e., 2.3 ohms), then controller 31 will switch to limit 24 (bin B) and color at a larger voltage. Controller 31 may then compare the resistance readings with the thresholds for limit 24. So next, controller 31 may get readings which are higher than 4.1 so the maximum limits, i.e., limit 27 (bin C) may be used. If while coloring, the temperature of device 16 changes and the readings fall below 4.2, then the limits will be decreased back to those of limit 24 (bin B). The nature of device 16 is such that as the device colors and absorbs light, it will also absorb heat and its temperature will rise. Data shows that such temperature rise is much slower than the response of controller 31 and thus there is not a need to switch from limit 27 (bin C) to limit 28 (bin A) thereby skipping limit 24 (bin B). In general, if a reading is below the current bins $R_{low}$ value then the temperature is too high and the voltage levels need to be reduced. If a reading is above the current bins $R_{high}$ value then the temperature is too cold and the voltage levels should be increased to improve the switching time of the device. Bin A does not have an $R_{low}$ value because it is already using the lowest limits and Bin C does not have an $R_{high}$ value because it is already using the highest limits. Another advantage of using a measurement mode with fixed voltages is that the resistance reading obtained applies for both cross-over values and an immediate jump from Bin A to Bin C can occur. This will improve the performance of the device by reducing the switching time required to reach a new state.

Figure 13:
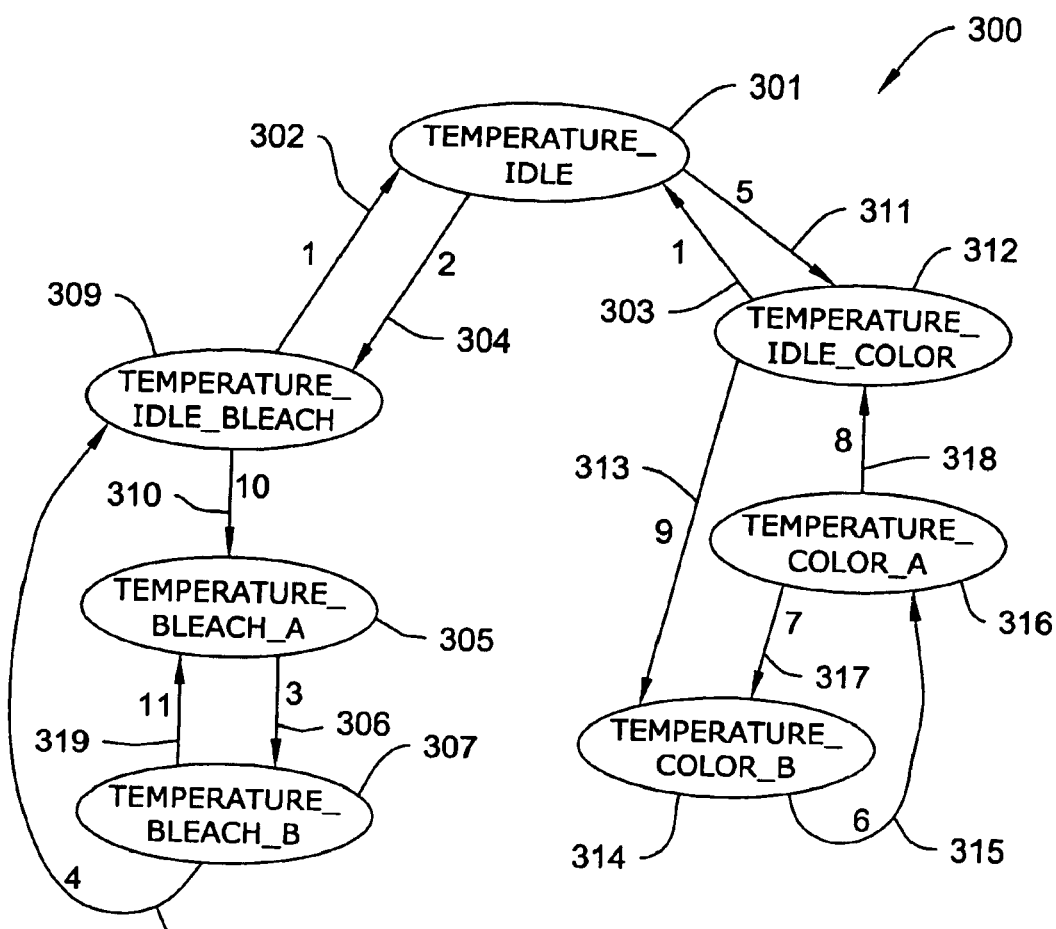
FIG. 13 is a state diagram of transitions and states for a temperature measuring state machine.

FIG. 13 is a state diagram 300 of transitions and states for the "Temperature_Measuring_State" machine. State diagram 300 is an implementation of the process, method or algorithm with using multiple measurements for coloring at each periodic measurement time and using the fixed voltage levels during the measurement period. Controller 31 may be in a holding mode or transitioning to a new transmissivity, then the temperature controller will be cycling through color states or the bleach states depending on which way the controller is going.

When controller 31 is in a holding mode, that is, it is not changing transmission level of the electrochromic device 16 being controlled. In that holding mode, the temperature measuring status is in a TEMPERATURE_IDLE state 301. This state is also a result of a transition one 302 which is a ceasing of bleaching, or of a transition one 303 which is a ceasing of coloring of device 16. For purposes of this description, $V_{out}$ is the voltage applied to device 16, $V_{high}$ is the largest safe positive voltage allowed for the current temperature of device 16, and $V_{low}$ is the largest safe negative voltage allowed for the current temperature of device 16.

Transition one 302 is when controller 31 via driver 32 is keeping device or EC glass 16 at a stable transmission level and a safe voltage. Here the measure-timer is disabled. There is no need to measure temperature of device 16. Transition two 304 is when controller 31 sends a signal to driver 32 to bleach the glass to a new light transitivity or transmission level. Here, the measure-timer is started to run for sixty seconds. The state of transition two 304 is to TEMPERATURE_IDLE_BLEACH 309. After measure-timer is timed out, transition ten 310 occurs to state TEMPERATURE_BLEACH_A 305. The terms "A" or "B" have no relationship to limits or bins A or B discussed above. It is just a step in the loop of bleaching described here. During the transition to state 305, the timer is restarted to run for ten seconds and the measure_R counter, which counts the number of resistance measurements, is cleared. Here, $V_{out}=V_{high}$. Transition three 306 occurs when the measure-timer has timed out after its ten seconds of running. The state entered is TEMPERATURE_BLEACH_B 307. Upon completion of transition three 306, the measure-timer is disabled. Voltage 1 and current 1 ($V_1+I_1$) values are read at the input of device 16 and saved. Here and after the values ($V_1+I_1$) are saved, $V_{out}=V_{low}$. The measure-timer is started to run for 0.5 second. When measure-timer times out after 0.5 second, transition eleven 319 or four 308 occurs. If more readings are needed for averaging, then transition eleven 319 occurs; if not, then transition four 308 occurs. Here, one may assume transition eleven 319 to occur at least once back to TEMPERATURE_BLEACH_A 305. The reason for this transition eleven 319 is that one would generally like to have at least two readings to average. For transition eleven 319 the measure timer is disabled, voltage 2 and current 2 levels ($V_2+I_2$) are read, resistance R is calculated and added to a running total for averaging, Vout=2 volts and the measure timer is started for ten seconds. When the measure-timer times out, transition three 306 occurs to TEMPERATURE_BLEACH_B 307 state again. The measure-timer is disabled, voltage 1 and current 1 ($V_1+I_1$) levels are read and saved, $V_{out}=V_{low}$, and measure-timer starts to run for 0.5 second. The next transition may be eleven 319 or four 308, depending on averaging requirements. Here, one may assume transition four to occur to state TEMPERATURE_IDLE_BLEACH 309. The measure-timer is disabled. Voltage 2 and current 2 values ($V_2+I_2$) are read. From the read values, the resistance R is calculated, i.e., (($V_1-V_2$)+($I_1-I_2$))–R@10 KHz. The average resistance is now calculated by dividing the running total by the number of samples in the average. This resistance infers a temperature of device 16 and the limit for bleaching is updated. Here, $V_{out}=V_{high}$ (based on a new limit). The measure-timer is started to run for sixty seconds. Here, the state is TEMPERATURE_IDLE_BLEACH and the controller continues bleaching the device to a new state. At this point, one of two transitions one 302 and ten 310 may occur upon timing out of measure-timer. If more bleaching device 16 is to be had, then transition ten 310 occurs going to state TEMPERATURE_BLEACH_A 305. The loop begins from this state 305, to transition three 306, state TEMPERATURE_BLEACH_B 307, transition eleven 319, or transition four 308 and back to TEMPERATURE_IDLE_BLEACH 309. Either loop may be repeated as many times as necessary to provide bleaching of device 16 to the sought transmission level. Once this level is attained, then transition one 302 occurs and the state machine returns to TEMPERATURE_IDLE state 301. This state 301 remains as long as there is no change of transmission level and controller 31 is in a holding mode.

If controller 31 sends a signal to driver 32 to color EC device 16 to a new transmission level, then transition five 311 occurs to state TEMPERATURE_IDLE_COLOR 312. The measure-timer is started to run for sixty seconds. Coloring proceeds at a safe voltage. Upon the timing out of the measure-timer, transition nine 313 occurs to state TEMPERATURE_COLOR_B 314. Here, $V_{out}$=2 volts. The measure_R counter, which counts the number of resistance measurements, is cleared. The measure-timer is started to run for two seconds. When the measure-timer has timed out, a transition six 315 occurs to state TEMPERATURE_COLOR_A 316. The measure-timer is disabled for now. Voltage 1 and current 1 ($V_1$+$I_1$) values are read at the input of EC device 16 and saved. $V_{out}$=−1 volt. The measure-timer is started to run for 0.5 second. At this point, one of two transitions seven 317 and eight 318 may occur. If no more readings are needed for averaging then transition eight 318 occurs to state TEMPERATURE_IDLE_COLOR 312. However, if more readings are required, then transition seven 317 occurs to state TEMPERATURE_COLOR_B 314 upon the timing out of the measure-timer. More readings are needed if the measure_R counter is less than NUMBER_OF_MEASUREMENTS. For transition seven 317, the measure-timer is disabled. Voltage 2 and current 2 ($V_2$+$I_2$) values are read at the input of EC device 16. From the read values, the resistance that infers the temperatures of device 16 is calculated from $((V_1-V_2)+(I_1-I_2))-R@10$ KHz. This value is then added to a running total for averaging. $V_{out}$=2 volts. The measure-timer is started to run for one second. Upon time out of the measure-timer, transition six 315 to state TEMPERATURE_COLOR_A 316 occurs. If more averaging is required, than the loop of transition seven 317, state TEMPERATURE_COLOR_B 314 and transition six 315 occurs again until NUMBER_OF_MEASUREMENTS readings have been collected. At this point the average R can be calculated, then from state TEMPERATURE_COLOR_A 316 to state TEMPERATURE_IDLE_COLOR 312, transition eight 318 occurs upon the timing out of measure-timer for one second. The measure_R counter has an indication greater or equal to NUMBER_OF_MEASUREMENTS. The measure-timer is disabled. A second set of values of voltage 2 and current 2 ($V_2$+$I_2$) is read at the input of EC device 16. From the first ($V_1$+$I_1$) and second ($V_2$+$I_2$) sets of values, the resistance of EC device 16 at its input terminals is calculated. This resistance is added to the running total and divided by NUMBER_OF_MEASUREMENTS to form the average resistance. Based on this resistance (with an inference to temperature), an update of the voltage limit for coloring is made. Here, $V_{out}=V_{high}$ based on the newly updated limit. The measure-timer is started to run for sixty seconds. Upon the timing out of the measure-timer, transition one 303 or nine 313 occurs. If there is more coloring to be pursued of EC device 16, then transition nine 313 occurs and then a loop from that transition to state TEMPERATURE_COLOR_B 314, transition six 315, TEMPERATURE_COLOR_A 316 and transition seven 317 occurs, or another loop from transition nine 313 to state TEMPERATURE_COLOR_B 314, transition six 315, state TEMPERATURE_COLOR_A, transition eight 318 and state TEMPERATURE_IDLE_COLOR 312 occurs. Either of these loops or a combination of them may occur so long as coloring of EC device 16 is to continue. If no coloring is to be done, then transition one 303 occurs from state TEMPERATURE_IDLE_COLOR 312 to state TEMPERATURE_IDLE 301. In this state 301, controller 31 holds EC device 16 at about a constant and stable transmissivity or transmission level with a safe driving voltage.

Figure 14:
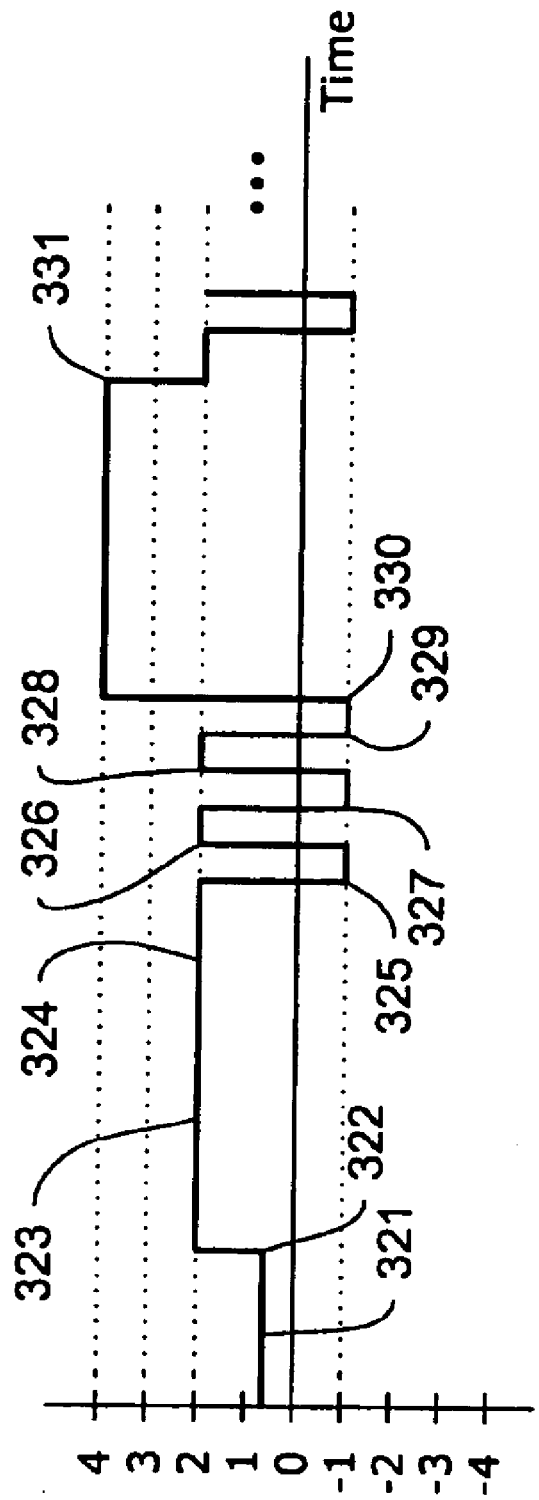
FIG. 14 is a diagram showing an example of a setpoint change which requires coloring.

FIG. 14 is a diagram showing an example of going through a setpoint change which requires coloring and what the temperature measuring state machine 300 of FIG. 13 will do. Here, it is assumed that the temperature of device 16 is minus 10 degrees C. Thus, the maximum safe voltage limits are about +4 and −4 volts D.C. The holding mode 321 has the temperature state of TEMPERATURE_IDLE 301. Then there is a transition five 311 at mode 322 which has a setpoint change which requires controller 31 to color device 16. This goes to a temperature state of TEMPERATURE_IDLE_COLOR 312 at mode 323. Transition nine 313 starts a measure mode at 324. Measure mode has a temperature state of TEMPERATURE_COLOR_B 314. At point 325 occurs transition six 315 where voltage 1 and current 1 levels are read prior to changing the voltage. The temperature state in this measure mode is TEMPERATURE_COLOR_A 316. At point 326 is transition seven 317 where voltage 2 and current 2 levels are read prior to changing the voltage, and in conjunction with the readings of voltage 1 and current 1, the resistance R of device 16 is calculated. The temperature of device 16 may be inferred from the resistance R. The voltage is changed. The temperature state is TEMPERATURE_COLOR_B 314. Another transition six 315 occurs at point 327. Voltage 1 and current 1 levels are measured and read and the voltage is changed as needed. The temperature state again becomes TEMPERATURE_COLOR_A 316. At point 328, another transition seven 317 occurs, and voltage 2 and current 2 levels are read, and resistance R is calculated and the voltage to device 16 is set to +2 volts to do more measurements. The temperature state is TEMPERATURE_COLOR_B 314. At point 329, transition six 315 occurs again and voltage 1 and current 1 levels are read again and the voltage is changed. The temperature state becomes TEMPERATURE_COLOR_A 316. At point 330, transition eight 318 occurs. Voltage 2 and current 2 levels are read, and resistance R is calculated. The average value for resistance is calculated and the limit is updated and the driving voltage to device 16 is changed to the maximum allowed at a new limit of about +4 volts D.C. The temperature state is TEMPERATURE_IDLE_COLOR 312. At point 331, transition nine 313 occurs again and the temperature state becomes TEMPERATURE_COLOR_B 314. This process is iterative until no further coloring is needed, transition one 303 occurs and the system returns to a holding mode at state TEMPERATURE_IDLE 301.

Figure 15:
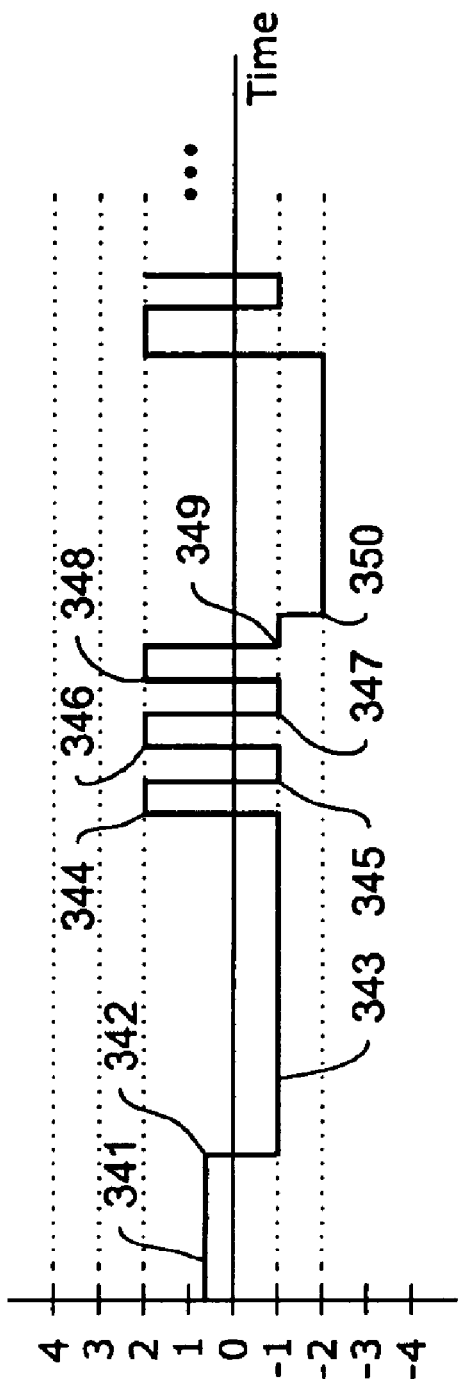
FIG. 15 is a diagram showing an example of going through a setpoint change which requires bleaching.

FIG. 15 shows an example of setpoint change for bleaching and what the temperature measuring state machine 300 of FIG. 13 will do. Here, it is assumed that the temperature of device 16 is 25 degrees C. so the maximum safe voltage limits are about +3 volts and about −2 volts D.C. At line 341, the system is in a holding mode, and the temperature state is TEMPERATURE_IDLE 301. At point 342, transition two 304 occurs and a setpoint change requires controller 31 to bleach device 16 to a new transmission level via a driver.

In this transmission mode 343, the temperature state is TEMPERATURE_IDLE_BLEACH 309. Transition ten 310 occurs from state 309 to TEMPERATURE_BLEACH_A 305 at point 344. Transition three 306 occurs to TEMPERATURE_BLEACH_B 307. Voltage 1 and current 1 levels are measured prior to changing the voltage. Then transition eleven 319 occurs at point 346 and the temperature state becomes TEMPERATURE_BLEACH_A 305. Voltage 2 and current 2 levels are measured prior to changing the voltage. Transition three 306 occurs at point 347 and the temperature state becomes TEMPERATURE_BLEACH_B 307. Voltage 1 and current 1 levels are measured prior to changing the voltage. Transition eleven 319 occurs at point 348 and the temperature state becomes TEMPERATURE_BLEACH_A 305. Voltage 2 and current 2 levels are measured prior to changing the voltage. Resistance R is calculated. Transition three 306 occurs at point 349 and the temperature state becomes TEMPERATURE_BLEACH_B 307. Voltage 1 and current 1 levels are measured prior to changing the voltage. Transition four 308 occurs at point 350 and the new temperature state becomes TEMPERATURE_IDLE_BLEACH 309. Voltage 2 and current 2 levels are measured prior to changing the voltage. Resistance R is calculated from the average of all the R readings and the limit is updated, and the driving voltage may be changed to the maximum allowed at the new limit, which is about minus 2 volts (for a temperature of 25 degrees C. If the controller reaches the new state (transmissivity) the system returns via transition one 302 to TEMPERATURE_IDLE 301, If not, transition two 304 may occur and the above-identified process may repeat itself.

For the purpose of this discussion the calculated value resistance was used as the indication of temperature. As was stated earlier, the temperature of the device affects the magnitude of current delivered to the device when applying a step voltage as well as the rate change of current when applying a fixed voltage across the device. Using other combinations of this voltage and current data may reveal a value that is easier to implement on a microcontroller. For example, if the voltage source driving the window is sufficient to provide a stable output voltage regardless of the current being supplied, the resistance calculation can be substituted with a simple difference of current since the voltage difference would be a constant. Eliminating the need for division would reduce code space required by the microcontroller.

Several conclusions may be drawn about the invention. A calculated value using a combination of measured voltages and currents delivered to an electrochromic device reveals a variance with device temperature. One such calculated value is a resistance measurement using delta V+delta I, as in shown equations (1) and (2). Since delta V and delta I can be measured, then the temperature of device 16 can be inferred. Limiting the number of safe operating voltages from five to three (i.e., as shown in FIGS. 2 and 3, respectively) allows for a simplified process of limit changes and yet does not result in giving up much in terms of device 16 performance as to the speed of coloring or bleaching. The nature of how long signals are applied prior to taking the delta V and delta I measurements affects repeatability of the measurement. The length of time between measurements will affect the performance of the device but must be small enough to catch a temperature increase to avoid damage due to over voltage. The cross-over values can be determined on the basis of two calculated resistances taken at room temperature, and thus the calibration process is achieved in a simplified manner.

Although the invention has been described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. A process for driving an electrochromic (EC) device comprising:

applying a driving signal to bleach or color the EC device, wherein initially the driving signal has a voltage amplitude that is harmless to the EC device at any temperature;

measuring a first voltage amplitude of the driving signal applied to the EC device;

measuring a second voltage amplitude of the driving signal applied to the EC device;

measuring a first current amplitude of the driving signal applied to the EC device;

measuring a second current amplitude of the driving signal applied to the EC device;

determining a voltage amplitude difference between the first voltage amplitude and the second voltage amplitude;

determining a current amplitude difference between the first current amplitude and the second current amplitude;

determining a first resistance from the voltage amplitude difference and the current amplitude difference;

determining a second resistance by subtracting a third resistance from the first resistance, wherein the third resistance is a static resistance of the EC device that is static relative to temperature change of the EC device; and adjusting the first and second voltage amplitudes to a maximum amplitude that is harmless to the EC device at a present temperature that is inferred from the second resistance.

2. The process of claim 1, wherein said process is repeated upon receipt of a first or second indication signal to bleach or color, respectively.

3. The process of claim 2, wherein:

the driving signal has a reversal of polarity for short periods of time;

the first and second voltage amplitudes are measured when the polarity is not reversed and reversed; and the first and second current amplitudes are measured when the polarity is not reversed and reversed.

4. The process of claim 3, wherein the reversal of the polarity of the driving signal is approximately periodic.

5. The process of claim 4, wherein the first voltage amplitude may be equivalent to any one of several set amplitudes, each set amplitude being harmless to the EC device within a particular range of temperatures of the EC device.

6. The process of claim 5, wherein the second voltage amplitude may be equivalent to any one of several set amplitudes, each set amplitude being harmless to the EC device within one of plurality of ranges of temperatures of the EC device.

7. The process of claim 6, wherein the plurality of ranges of temperatures is at least three ranges of temperatures.

8. The process of claim 7, wherein the plurality of ranges of temperatures do not necessarily overlap with one another.

9. The process of claim 8, wherein the first and second voltage amplitudes are at a plus or minus values.

10. The process of claim 2, wherein any temperature is the operational temperature range of the EC device.

11. The process of claim 3, wherein the first voltage amplitude is at an amplitude that is harmless to the EC device at any temperature.

12. The process of claim 4, wherein the second voltage amplitude is at an amplitude that is harmless to the EC device at any temperature.

* * * * *

UNITED STATES PATENT AND TRADEMARK OFFICE
CERTIFICATE OF CORRECTION

PATENT NO. : 6,856,444 B2
DATED : February 15, 2005
INVENTOR(S) : James F. Ingalls and Freek Stoffelen It is certified that error appears in the above-identified patent and that said Letters Patent is hereby corrected as shown below:

Title page,
Item [73], Assignee, "Fatibault," should read -- Faribault --.

Signed and Sealed this

Twenty-eighth Day of June, 2005

JON W. DUDAS
*Director of the United States Patent and Trademark Office*